(12) United States Patent
Colrain et al.

(10) Patent No.: US 7,953,860 B2
(45) Date of Patent: May 31, 2011

(54) FAST REORGANIZATION OF CONNECTIONS IN RESPONSE TO AN EVENT IN A CLUSTERED COMPUTING SYSTEM

(75) Inventors: Carol Colrain, Redwood Shores, CA (US); Rajkumar Irudayaraj, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1156 days.

(21) Appl. No.: 10/917,663

(22) Filed: Aug. 12, 2004

(65) Prior Publication Data

US 2005/0038801 A1    Feb. 17, 2005

Related U.S. Application Data

(60) Provisional application No. 60/500,096, filed on Sep. 3, 2003, provisional application No. 60/495,368, filed on Aug. 14, 2003.

(51) Int. Cl.
*G06F 15/16* (2006.01)

(52) U.S. Cl. ........................................ 709/227

(58) Field of Classification Search .................. None
See application file for complete search history.

(56) References Cited

U.S. PATENT DOCUMENTS

| | | |
|---|---|---|
| 5,566,316 A | 10/1996 | Fechner et al. |
| 5,600,791 A | 2/1997 | Carlson et al. |
| 5,721,825 A | 2/1998 | Lawson et al. |
| 5,774,668 A | 6/1998 | Choquier et al. |
| 5,890,167 A | 3/1999 | Bridge, Jr. et al. |
| 5,918,059 A | 6/1999 | Tavallaei et al. |
| 5,933,604 A | 8/1999 | Inakoshi |
| 5,951,694 A | 9/1999 | Choquier et al. |
| 6,041,357 A | 3/2000 | Kunzelman et al. |
| 6,061,678 A | 5/2000 | Klein et al. |
| 6,088,727 A | 7/2000 | Hosokawa et al. |
| 6,088,728 A | 7/2000 | Bellemore et al. |

(Continued)

FOREIGN PATENT DOCUMENTS

EP    0 750 256 A2    6/1996

(Continued)

OTHER PUBLICATIONS

Ravi Kokku et al., "Half-pipe Anchoring: An Efficient Technique for Multiple Connection Handoff," Proceedings 10$^{th}$ International Conference on Network Protocols, Nov. 12, 2002, XP010632563, 10 pages.

(Continued)

*Primary Examiner* — Ario Etienne
*Assistant Examiner* — Clayton R Williams
(74) *Attorney, Agent, or Firm* — Hickman Palermo Truong & Becker LLP; Deborah L. Caswell

(57) ABSTRACT

Techniques for fast recovery and/or balancing of connections to a clustered computing system provide management of such connections by determining a number of connections to load balance across nodes and by triggering creation of such connections. In one aspect, a notification of an event regarding the clustered computing system is received by a connection pool manager, a pool of connections to the system is identified based on the notification, and one or more connections from the pool are processed in response to the event. According to an embodiment, the notification comprises the identities of the service, database, server instance and machine that correspond to the event.

29 Claims, 4 Drawing Sheets

U.S. PATENT DOCUMENTS

| | | | |
|---|---|---|---|
| 6,105,067 A * | 8/2000 | Batra | 709/227 |
| 6,178,529 B1 * | 1/2001 | Short et al. | 714/51 |
| 6,192,401 B1 | 2/2001 | Modiri et al. | |
| 6,243,718 B1 | 6/2001 | Klein et al. | |
| 6,243,751 B1 | 6/2001 | Chatterjee et al. | |
| 6,266,666 B1 | 7/2001 | Ireland et al. | |
| 6,279,001 B1 | 8/2001 | DeBettencourt et al. | |
| 6,304,967 B1 | 10/2001 | Braddy | |
| 6,310,883 B1 | 10/2001 | Mann et al. | |
| 6,321,235 B1 | 11/2001 | Bird | |
| 6,327,622 B1 * | 12/2001 | Jindal et al. | 709/228 |
| 6,353,898 B1 * | 3/2002 | Wipfel et al. | 714/48 |
| 6,389,431 B1 * | 5/2002 | Frolund et al. | 707/202 |
| 6,438,705 B1 * | 8/2002 | Chao et al. | 714/4 |
| 6,453,314 B1 | 9/2002 | Chan et al. | |
| 6,556,659 B1 | 4/2003 | Bowman-Amuah | |
| 6,587,866 B1 | 7/2003 | Modi et al. | |
| 6,601,101 B1 | 7/2003 | Lee et al. | |
| 6,615,265 B1 * | 9/2003 | Leymann et al. | 709/227 |
| 6,718,394 B2 | 4/2004 | Cain | |
| 6,728,748 B1 | 4/2004 | Mangipudi et al. | |
| 6,738,790 B1 | 5/2004 | Klein et al. | |
| 6,748,414 B1 | 6/2004 | Bournas | |
| 6,816,907 B1 | 11/2004 | Mei et al. | |
| 6,912,588 B1 | 6/2005 | Jardin et al. | |
| 6,950,848 B1 | 9/2005 | Yousefi'zadeh | |
| 6,952,766 B2 | 10/2005 | Dervin et al. | |
| 6,978,366 B1 | 12/2005 | Ignatchenko et al. | |
| 7,039,654 B1 | 5/2006 | Eder | |
| 7,058,717 B2 | 6/2006 | Chao et al. | |
| 7,058,957 B1 | 6/2006 | Nguyen | |
| 7,082,117 B2 | 7/2006 | Billhartz | |
| 7,093,250 B1 | 8/2006 | Rector | |
| 7,136,825 B2 | 11/2006 | Araki et al. | |
| 7,174,379 B2 | 2/2007 | Agarwal et al. | |
| 7,178,050 B2 | 2/2007 | Fung et al. | |
| 7,263,590 B1 | 8/2007 | Todd et al. | |
| 7,269,157 B2 | 9/2007 | Klinker et al. | |
| 7,272,653 B2 | 9/2007 | Levy-Abegnoli et al. | |
| 7,349,968 B1 | 3/2008 | Darugar et al. | |
| 7,395,328 B2 | 7/2008 | Ronneburg et al. | |
| 7,500,001 B2 | 3/2009 | Tameshige et al. | |
| 7,506,034 B2 | 3/2009 | Coates et al. | |
| 7,512,686 B2 | 3/2009 | Berg | |
| 2001/0027406 A1 | 10/2001 | Araki et al. | |
| 2001/0027491 A1 | 10/2001 | Terretta et al. | |
| 2001/0056493 A1 | 12/2001 | Mineo | |
| 2002/0055982 A1 * | 5/2002 | Goddard | 709/217 |
| 2002/0073139 A1 | 6/2002 | Hawkins et al. | |
| 2002/0099598 A1 * | 7/2002 | Eicher et al. | 705/11 |
| 2002/0129157 A1 | 9/2002 | Varsano | |
| 2002/0161896 A1 | 10/2002 | Wen et al. | |
| 2002/0194015 A1 | 12/2002 | Gordon et al. | |
| 2002/0198985 A1 | 12/2002 | Fraenkel et al. | |
| 2003/0005028 A1 | 1/2003 | Dritschler et al. | |
| 2003/0007497 A1 | 1/2003 | March et al. | |
| 2003/0037146 A1 | 2/2003 | O'Neill | |
| 2003/0039212 A1 | 2/2003 | Lloyd et al. | |
| 2003/0046298 A1 | 3/2003 | Weedon | |
| 2003/0065986 A1 | 4/2003 | Fraenkel et al. | |
| 2003/0074475 A1 | 4/2003 | Ollikainen | |
| 2003/0081748 A1 | 5/2003 | Lipinski | |
| 2003/0088671 A1 | 5/2003 | Klinker et al. | |
| 2003/0108052 A1 | 6/2003 | Inoue et al. | |
| 2003/0135609 A1 | 7/2003 | Carlson et al. | |
| 2003/0135642 A1 | 7/2003 | Benedetto et al. | |
| 2003/0167456 A1 | 9/2003 | Sabharwal | |
| 2003/0172145 A1 | 9/2003 | Nguyen | |
| 2003/0204509 A1 * | 10/2003 | Dinker et al. | 707/100 |
| 2003/0208523 A1 | 11/2003 | Gopalan et al. | |
| 2003/0229695 A1 | 12/2003 | McBride | |
| 2004/0019680 A1 * | 1/2004 | Chao et al. | 709/226 |
| 2004/0030801 A1 | 2/2004 | Moran et al. | |
| 2004/0064548 A1 | 4/2004 | Adams et al. | |
| 2004/0088413 A1 * | 5/2004 | Bhogi et al. | 709/226 |
| 2004/0092260 A1 | 5/2004 | Thubert et al. | |
| 2004/0098490 A1 * | 5/2004 | Dinker et al. | 709/229 |
| 2004/0103195 A1 | 5/2004 | Chalasani et al. | |
| 2004/0111506 A1 | 6/2004 | Kundu et al. | |
| 2004/0117375 A1 | 6/2004 | Saha et al. | |
| 2004/0117794 A1 | 6/2004 | Kundu | |
| 2004/0176996 A1 | 9/2004 | Powers et al. | |
| 2004/0205101 A1 | 10/2004 | Radhakrishnan | |
| 2004/0221031 A1 | 11/2004 | Desai | |
| 2004/0243699 A1 | 12/2004 | Koclanes et al. | |
| 2004/0257985 A1 | 12/2004 | Sahai et al. | |
| 2004/0268357 A1 | 12/2004 | Joy et al. | |
| 2005/0021771 A1 | 1/2005 | Kaehn et al. | |
| 2005/0050116 A1 | 3/2005 | Gross et al. | |
| 2005/0165925 A1 | 7/2005 | Dan et al. | |
| 2005/0188091 A1 | 8/2005 | Szabo et al. | |
| 2005/0239476 A1 | 10/2005 | Betrabet et al. | |
| 2005/0262183 A1 | 11/2005 | Colrain et al. | |
| 2005/0267965 A1 | 12/2005 | Heller | |
| 2006/0036617 A1 | 2/2006 | Bastawala et al. | |
| 2007/0226323 A1 | 9/2007 | Halpern | |
| 2008/0027769 A1 | 1/2008 | Eder | |
| 2008/0228923 A1 | 9/2008 | Chidambaran et al. | |

FOREIGN PATENT DOCUMENTS

| | | | |
|---|---|---|---|
| EP | 0 942 363 A2 | 9/1999 | |
| EP | 0942363 A2 | 9/1999 | |
| EP | 0 992 909 A2 | 4/2000 | |
| EP | 1 170 662 A2 | 1/2002 | |
| EP | 1 260 902 A2 | 5/2002 | |
| JP | 10-187638 | 7/1998 | |
| WO | WO 0010084 A | 2/2000 | |
| WO | WO 02/05116 A2 | 1/2002 | |
| WO | WO 02/07037 A1 | 1/2002 | |
| WO | WO 02/097676 A2 | 12/2002 | |
| WO | WO 03/014928 A1 | 2/2003 | |
| WO | WO 03/014928 A2 | 2/2003 | |
| WO | WO 03014929 A | 2/2003 | |
| WO | WO 03/048934 A2 | 6/2003 | |
| WO | WO 03/062983 A2 | 7/2003 | |

OTHER PUBLICATIONS

Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

International Searching Authority, "Notification of Transmittal of the International Search Report and the Written Opinion of the International Searching Authority, or the Declaration," Nov. 12, 2004, 13 pages.

Current Claims of International Application No. PCT/US2004/026570, 4 pages.

Current Claims of International Application No. PCT/US2004/025805, 8 pages.

International Searching Authority, "Notification of Transmittal of the International Search Report and the Written Opinion of the International Searching Authority, or the Declaration," dated Dec. 3, 2004, 12 pages.

International Searching Authority, "Notification of the Transmittal of the International Search Report and Written Opinion of the International Searching Authority, or the Declaration," PCT/US2005/025887, dated Feb. 6, 2006, 12 pages.

Current Claims, PCT/US2005/025887, 3 pages.

International Preliminary Examining Authority, "Written Opinion of the International Preliminary Examining Authority," Jun. 7, 2005, 4 pages.

Current Claims of International Application No. PCT/US04/26570, 4 pages.

International Searching Authority, "Notification of Transmittal of the International Search Report and the Written Opinion of the International Searching Authority, or the Declaration," Aug. 4, 2005, 13 pages.

Current Claims for International Application No. PCT/US2004/026389, pp. 1-7.

Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.

European Patent Office, "International Preliminary Report on Patentability," Aug. 26, 2005, International Application No. PCT/US2004/026570, 9 pages.

International Searching Authority, "Notification of Transmittal of the International Search Report and the Written Opinion of the International Searching Authority, or the Declaration," Aug. 25, 2005, 12 pages.

Current Claims for International Application No. PCT/US2004/026445, pp. 1-5.

Henry Song, et al., "Browser State Repository Service," Lecture Notes in Computer Science, vol. 2414, 2002, pp. 1-14, XP002904339.

Eric Skow, et al., "A Security Architecture for Application Session Handoff," 2002, IEEE International Conference Proceedings, Apr. 28-May 2, 2002, vol. 1 of 5, pp. 2058-2063, XP010589848.

Chase, Jeffrey S., "Dynamic Virtual Clusters in a Grid Site Manager," Proceedings of the IEEE International Symposium on HPDC-2003, XP010463715, pp. 90-100.

International Searching Authority, "Notification of the Transmittal of the International Search Report and the Written Opinion of the International Searching Authority, or the Declaration", PCT/US2004/026405, dated Aug. 19, 2005, 5 pages.

Claims, PCT/US2004/026405, 7 pages.

International Searching Authority, "Notification of the Transmittal of the International Search Report and Written Opinion of the International Searching Authority, or the Declaration," PCT/US2004/026506, dated Sep. 8, 2005, 12 pages.

Current Claims, PCT/US2004/026506, 9 pages.

"Office Action" in related case U.S. Appl. No. 10/917,661, filed Aug. 12, 2004, 9 pages.

"Office Action" in related case U.S. Appl. No. 10/918,056, filed Aug. 12, 2004, 9 pages.

"Office Action" in related case U.S. Appl. No. 10/917,687, filed Aug. 12, 2004, 9 pages.

Japanese Patent Office, "Notice of Grounds of Rejection", Patent application No. 523435-2006, English Translation, mailed Jun. 9, 2009, 2 pages.

* cited by examiner

```
┌─────────────────────────────────────────────────┐
│ RECEIVE A NOTIFICATION OF AN EVENT THAT IDENTIFIES│
│ A TERMINATION OF A SERVICE THAT IS HOSTED BY AN │
│ APPLICATION INSTANCE OF A CLUSTERED COMPUTING   │
│                    SYSTEM                        │
│                     202                          │
└─────────────────────────────────────────────────┘
                        │
                        ▼
┌─────────────────────────────────────────────────┐
│ BASED ON THE NOTIFICATION, IDENTIFY A POOL OF   │
│ CONNECTIONS THAT IS ASSOCIATED WITH THE         │
│              PARTICULAR SERVICE                  │
│                     204                          │
└─────────────────────────────────────────────────┘
                        │
                        ▼
┌─────────────────────────────────────────────────┐
│ IDENTIFY ONE OR MORE CONNECTIONS, FROM THE POOL,│
│ THAT IS ASSOCIATED WITH THE PARTICULAR INSTANCE │
│                     206                          │
└─────────────────────────────────────────────────┘
                        │
                        ▼
┌─────────────────────────────────────────────────┐
│      MARK THE ONE OR MORE CONNECTIONS AS INVALID │
│                     208                          │
└─────────────────────────────────────────────────┘
                        │
                        ▼
┌─────────────────────────────────────────────────┐
│          ABORT THE ONE OR MORE CONNECTIONS       │
│                     210                          │
└─────────────────────────────────────────────────┘
```

*FIG. 2*

FAST REORGANIZATION OF CONNECTIONS IN RESPONSE TO AN EVENT IN A CLUSTERED COMPUTING SYSTEM

CROSS REFERENCE TO RELATED APPLICATIONS

This application claims the benefit of priority to U.S. Provisional Patent Application No. 60/500,096 filed on Sep. 3, 2003, entitled "Service Based Workload Management and Measurement In a Distributed System"; and claims the benefit of priority to U.S. Provisional Patent Application No. 60/495,368 filed on Aug. 14, 2003, entitled "Computer Resource Provisioning"; and is related to U.S. patent application Ser. No. 10/917,660 filed on Aug. 12, 2004, entitled "Fast Application Notification in a Clustered Computing System"; and is related to U.S. patent application Ser. No. 10/917,715 filed on Aug. 12, 2004, entitled "Measuring Workload By Service"; the contents of all of which are incorporated by this reference in their entirety for all purposes as if fully set forth herein.

FIELD OF THE INVENTION

The present invention relates generally to management of connection pool sessions and, more specifically, to fast reorganization of connections to a clustered computing system.

BACKGROUND OF THE INVENTION

Clustered Computing System

A clustered computing system is a collection of interconnected computing elements that provide processing to a set of client applications. Each of the computing elements is referred to as a node. A node may be a computer interconnected to other computers, or a server blade interconnected to other server blades in a grid. A group of nodes in a clustered computing system that have shared access to storage (e.g., have shared disk access to a set of disk drives or non-volatile storage) and that are connected via interconnects is referred to herein as a work cluster.

A clustered computing system is used to host clustered servers. A server is combination of integrated software components and an allocation of computational resources, such as memory, a node, and processes on the node for executing the integrated software components on a processor, where the combination of the software and computational resources are dedicated to providing a particular type of function on behalf of clients of the server. An example of a server is a database server. Among other functions of database management, a database server governs and facilitates access to a particular database, processing requests by clients to access the database.

Resources from multiple nodes in a clustered computing system can be allocated to running a server's software. Each allocation of the resources of a particular node for the server is referred to herein as a "server instance" or instance. A database server can be clustered, where the server instances may be collectively referred to as a cluster. Each instance of a database server facilitates access to the same database, in which the integrity of the data is managed by a global lock manager.

Services for Managing Applications According to Service Levels

Services are a feature for database workload management that divide the universe of work executing in the database, to manage work according to service levels. Resources are allocated to a service according to service levels and priority. Services are measured and managed to efficiently deliver the resource capacity on demand. Source high availability service levels use the reliability of redundant parts of the cluster.

Services are a logical abstraction for managing workloads. Services can be used to divide work executing in a database cluster into mutually disjoint classes. Each service can represent a logical business function, e.g., a workload, with common attributes, service level thresholds, and priorities. The grouping of services is based on attributes of the work that might include the application function to be invoked, the priority of execution for the application function, the job class to be managed, or the data range used in the application function of a job class. For example, an electronic-business suite may define a service for each responsibility, such as general ledger, accounts receivable, order entry, and so on. Services provide a single system image to manage competing applications, and the services allow each workload to be managed in isolation and as a unit. A service can span multiple server instances in a cluster or multiple clusters in a grid, and a single server instance can support multiple services.

Middle tier and client/server applications can use a service by, for example, by specifying the service as part of the connection. For example, application server data sources can be set to route to a service. In addition, server-side work sets the service name as part of the workload definition. For example, the service that a job class uses is defined when the job class is created, and during execution, jobs are assigned to job classes and job classes run within services.

Database Sessions

In order for a client to interact with a database server on a database cluster, a session is established for the client. Each session belongs to one service. A session, such as a database session, is a particular connection established for a client to a server, such as a database instance, through which the client issues a series of requests (e.g., requests for execution of database statements). For each database session established on a database instance, session state data is maintained that reflects the current state of a database session. Such information contains, for example, the identity of the client for which the session is established, the service used by the client, and temporary variable values generated by processes executing software within the database session. Each session may each have its own database process or may share database processes, with the latter referred to as multiplexing.

Connections are mechanisms for enabling sessions. A connection may refer to either a physical mechanism or a logical connection mechanism, or both. Often, there is a one-to-one mapping of logical connections to physical connections; however, it is possible to have more than one logical connection associated with single physical connection or more than one physical connection associated with a single logical connection. Regardless, management of connections to a clustered database that comprises multiple server instances executing on multiple machines is amplified as the number of instances, machines and clusters increases. An important and challenging feature that is expected from a clustered database is management of many connections to the clustered database server.

When using a connection pool, an application may "borrow" a connection from a connection pool and put the connection back into the pool when the session is ended. Generally, a session is a vehicle to perform work with a database.

High Availability

Certain changes occur within clustered computing systems which reduce high availability and cause client applications to waste time. Such changes can be generally classified as either a "down" change, an "up" change, or a "not restarting" change. A down change occurs when a service, a server instance, or a node machine (generally, a "component") terminates, or "goes down." An up change occurs when a service, a server instance, or a node initializes, or "comes up." A "not restarting" change occurs when a service, instance or node can no longer start. Some changes may affect the existing sessions, as well as connections that are not currently in use but that are already created and associated with a service, instance or node.

Applications waste significant amounts of time and resources in their interactions with a clustered system, via a session, when the state of the clustered system changes. In particular, client applications of a clustered database waste time and resources when the state of the clustered system changes. For example, when a node or a server instance that the session is using "goes down," the application may not be interrupted for a long period of time. Specifically, if the node or network fails to close the session sockets, the application waits for a TCP/IP timeout error from the local TCP/IP stack. For another example, work may not be distributed across all instances supporting a service when a new service, node or instance becomes available, i.e., "comes up." In other words, time is wasted by not connecting with a service, node or instance when it becomes available. One other way in which time and resources are wasted is when clients keep retrying to communicate with a component that will not be coming back up, or has not restarted.

In general, traditional systems perform very poorly when a node goes down. Application sessions can wait up to two hours to be interrupted. In general, traditional systems function poorly in allocating work to a restored entity when a failed system entity is restored (i.e., an entity that has come up). Thus, traditional systems provide reduced availability, and potentially reduced service times, from what such a system could provide. Furthermore with traditional systems, following repair or restore of a failed component, traditional cold-failover systems typically offer fallback of the entire workload to the restored entity, rather than offering load balancing across the complement of components in the cluster.

Based on the foregoing, there is a general need for fast redistribution of sessions on a clustered computing system when a change occurs. There is a more specific need for fast processing of sessions to a clustered server in response to changes to resources in the cluster system.

BRIEF DESCRIPTION OF THE DRAWINGS

Embodiments of the present invention are depicted by way of example, and not by way of limitation, in the figures of the accompanying drawings and in which like reference numerals refer to similar elements and in which:

FIG. 2 is a flow diagram that illustrates a method for managing connections in response to an instance down event, according to an embodiment;

DETAILED DESCRIPTION OF EMBODIMENTS OF THE INVENTION

Functional Overview of Embodiments

Figure 1:
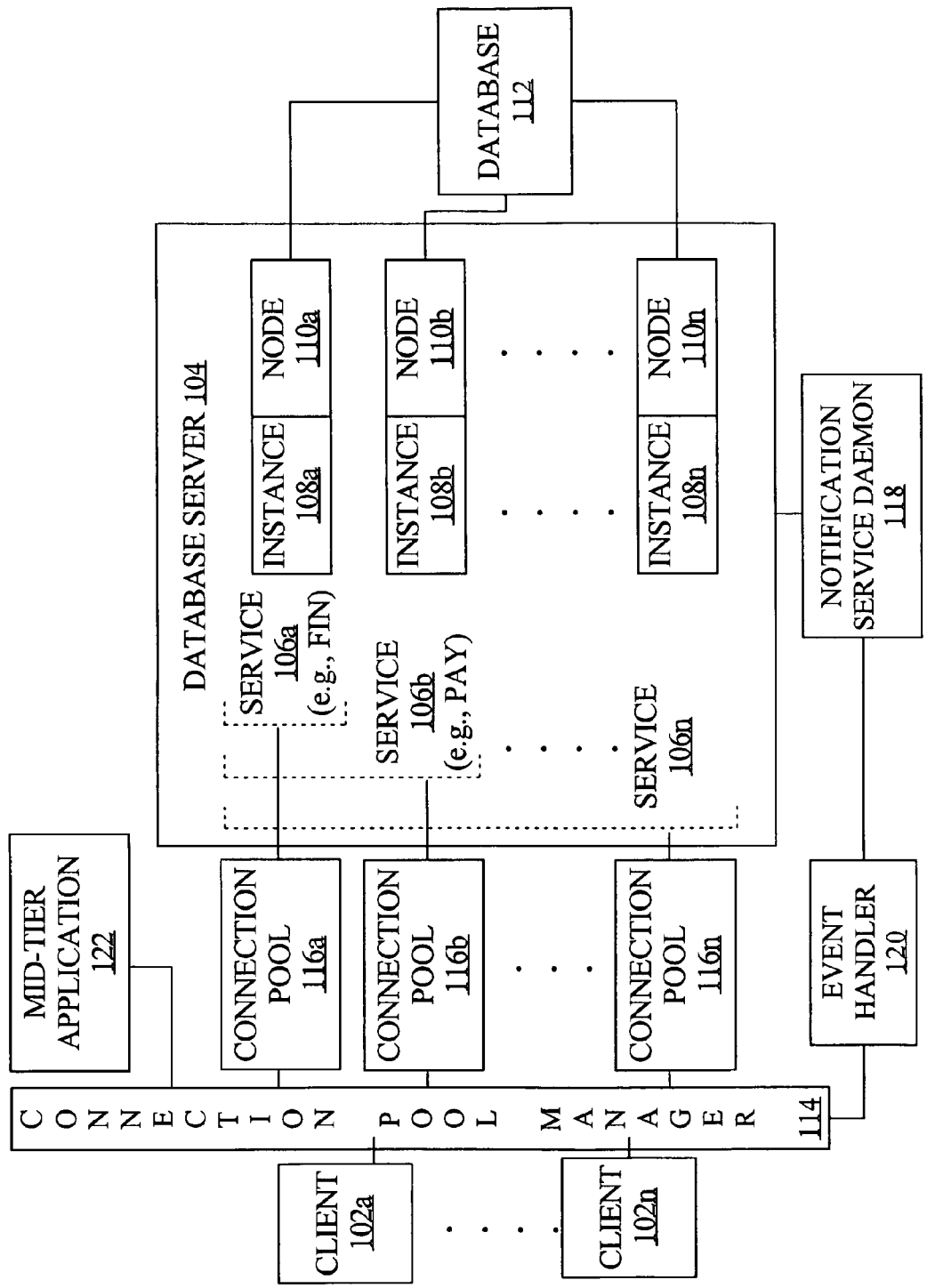
FIG. 1 is a block diagram that illustrates an operating environment in which an embodiment can be implemented.

Techniques for fast reorganization of session connections to a clustered computing system in response to system changes, are described, in which a notification of an event regarding the system is received and a connection manager or client/server application responds by redistributing, within the system, connections from a connection pool. One example of such a clustered computing system is a clustered database server comprising multiple instances of a database server executing on multiple nodes configured to access and manipulate data from a database in response to requests from multiple client applications.

In one aspect, a notification of an event (e.g., a change in the status of a system resource) regarding the clustered computing system is received by a connection pool manager from an event handler, a pool of connections to the system is identified based on the notification, and one or more connections from the pool is processed in response to the event. In an embodiment, the notification comprises the identities of the service, database, instance and node that correspond to the event. With use of a described event processing mechanism, session requestors benefit from the high availability of connections in the pool and a balanced distribution of connections across functioning services, which results in better performance and scalability of the computing system.

The event to which the connection pool manager responds may be a DOWN event, an UP event, or a NOT RESTARTING event. For example, with a service down on a service or node event, connections that are associated with the service or node are identified from the pool and are quickly marked as invalid and removed from the associated pool. Thus, clients that are using the related service will not waste time trying to communicate with, or waiting for a response from, the down session. For another example, with a service up event, a number of sessions that were previously removed from the associated pool is quickly identified, for balancing across active instances associated with a related service. In scenarios in which no connections were previously removed from the pool, a subset of connections from the pool are closed and recreated, for allocation to and balancing across active instances associated with the related service.

With use of the described technique, an entire connection pool is addressed in response to a system event, rather than addressing connections in a piece-meal manner. Therefore, "stale" or useless (i.e., invalid) connections are rapidly removed from the respective connection pool, and mid-tier applications can instantly handle session requests to the system by handing out only valid connections, which is more efficient than the piece-meal approach.

The techniques described herein are primarily described in the context of connection pools; however, these techniques are not limited to use with connection pools. For example, in a client/server context, clients are interrupted in response to a down event, retry if the service is unavailable, and reconnect in response to an up event.

Operating Environment

FIG. 1 is a block diagram that illustrates an operating environment in which an embodiment can be implemented. Embodiments of the invention may be implemented using a connection pool manager that is associated with a clustered computing system, such as a clustered database server comprising multiple database server instances executing on multiple host nodes to access and manipulate shared data stored on a data storage mechanism.

Use of element identifiers ranging from a to n, for example, clients 102a-102n, services 106a-106n, instances 108a-108n, and nodes 110a-110n, does not mean that the same number of such components are required. In other words, n is not necessarily equal for the respective components. Rather, such identifiers are used in a general sense in reference to multiple similar components.

One or more clients 102a-102n are communicatively coupled to a server 104. Server 104 refers to database server instances 108a-108n and nodes 110a-110n on which the instances execute. Other components may also be considered as part of the server 104, such as a connection pool manager 114, connection pools 116a-116n, a notification service daemon 118 and an event handler 120. The actual architecture in which the foregoing components are configured may vary from implementation to implementation.

In FIG. 1, connection pool manager 114 and connection pools 116a-116n are depicted as components not within server 104 for purposes of example. Connection pool manager 114 is communicatively coupled to and utilized by an application server or, generally, a middle tier application 122. In addition, connection pool manager 114 is logically coupled to connection pools 116a-116n, which are logically coupled to server 104. Notification service daemon 118 and event handler 120 are also depicted as not within server 104, and are communicatively coupled to server 104.

Clients 102a-102n may be applications executed by computers interconnected to an application server or some other middleware component between the clients and server 104 via, for example, a network.

Database 112 comprises data and metadata that is stored on a persistent memory mechanism, such as a set of hard disks that are communicatively coupled to nodes 110a-110n, each of which is able to host one or more instances 108a-108n, each of which hosts at least a portion of one or more services. Such data and metadata may be stored in database 112 logically, for example, according to relational database constructs, multidimensional database constructs, or a combination of relational and multidimensional database constructs. Nodes 110a-110n can be implemented as a conventional computer system, such as computer system 400 illustrated in FIG. 4.

As described, a database server, such as each of instances 108a-108n, is a combination of integrated software components and an allocation of computational resources (such as memory and processes) for executing the integrated software components on a processor, where the combination of the software and computational resources are used to manage a particular database, such as database 112. Among other functions of database management, a database server typically governs and facilitates access to database 112 by processing requests from clients to access the database 112. Therefore, connection pool manager 114, which manages connections to server 104, can be implemented as a processing layer between clients 102a-102n and instances 108a-108n, which manage access to database 112. Instances 108a-108n, in conjunction with respective nodes 110a-110n, host services, described hereafter.

Services 106

As described, services are a logical abstraction for managing workloads. A service, such as service 106a-106n, is the performance of work of a particular type or category, where the work performed is for the benefit of one or more clients of one or more servers, and where a level or quality of performance is prescribed for the particular type or category of work. The work performed as part of a service includes any use or expenditure of computer resources, including, for example, CPU processing time, storing and accessing data in volatile memory, read and writes from and/or to persistent storage (i.e. disk space), and use of network or bus bandwidth.

In general, a service is work that is performed by a database server and typically includes the work performed to process and/or compute queries that require access to a particular database. The term query as used herein refers to a statement that conforms to a database language, such as SQL, and includes statements that specify operations to add, delete, or modify data and create and modify database objects, such as tables, objects views, and executable routines.

A single database may support many services. For a non-limiting example, services may be divided into a FIN service and a PAY service, where the FIN and PAY services share the clustered database. The FIN service is the database service performed by server 104 for a FIN application. Typically, the FIN service involves accessing database objects on database 112 that store data for FIN applications. The PAY service is the service performed by server 104 for PAY applications. Typically, the PAY service involves accessing database objects on database 112 that store data for PAY applications.

Database instances of a database cluster are allocated to supporting one or more services. When a database instance (or node) is allocated to perform a service, the database instance is referred to herein as hosting, running, or providing the service, and the service is referred to herein as running or being placed on the database instance.

Services can be provided by one or more database server instances. The service on each instance is referred to as a master of that service. Thus, multiple server instances may work together to provide a service to a client. In FIG. 1, service 106a (e.g., FIN) is depicted, with dashed brackets, as being provided by instance 108a, service 106b (e.g., PAY) is depicted as being provided by instances 108a and 108b, and service 106n is depicted as being provided by instances 108a-108n.

Generally, the techniques described herein are service-centric, where events occurring within server 104 can be identified and/or characterized based on the service(s) which is affected by the event.

Connection Pool Manager 114 and Connection Pools 116

The connection pool manager 114 is a software component, which manages connection pools 116a-116n and requests for connections for sessions with server 104, including the routing of connection requests to the appropriate connection pool 116a-116n, based on the pool setup and configuration. Each connection pool 116a-116n is a set of connections to database sessions. Each session, for which communications between a client 102a-102n and an instance 108a-108n are transmitted through one of the connections from a respective connection pool 116a-116n, is considered a session with an instance 108a-108n.

Each connection can be instantiated as a connection object and for each connection object, the following information is recorded when a session connection is established: (1) the service that the session is using; (2) the name of the cluster node on which the associated service is available and to which this connection belongs; (3) the unique name of the database in use; and (4) the name of the instance to which this connection's database session belongs. Thus, the location (at times referred to as the "signature") of each session is uniquely identified. The manner in which the signature is recorded may vary from implementation to implementation. For non-limiting examples, a signature may be recorded to a "bulletin board" mechanism that is accessible to various subscribers, or the signature may be stored in an indexed table or a hash table. The signature is also returned to the connection in various ways. In one embodiment, a handle is used as part of a connection conversation. Detailed actions that various subscribers may perform in response to notification events are beyond the scope of this description.

Methods for managing session connections, which are performed by connection pool manager 114 in conjunction with associated worker threads, are described in reference to FIG. 2.

Generally, connection pool manager 114 is responsible for creation, maintenance and removal of connections and connection pools 116a-116n. For example, connection pool manager 114 may be used to manage connection pools 116a-116n through use of a set of APIs. In addition, connection pool manager 114 binds a connection pool 116a-116n to its corresponding data source object. In this context, a data source object is an abstraction of an interface to the database 112. Hence, binding a connection pool to a data source object may include mapping the connection pool to the data source object via a URL that identifies the associated service and the port through which the database 112 is accessed for the service.

In one embodiment, each connection pool 116a-116n has an associated connection pool factory object and during its lifecycle a given connection pool factory object has a default user, default password and URL associated therewith. Typically, the default user/password information is configured on a connection-pool-enabled data source. Hence, there is a connection pool factory object per connection pool, from which connections are created and populated into the connection pool, as a default.

As part of a connection pool creation process, the connection pool manager 114 may copy appropriate data source object properties to the connection pool factory object that specifically handles requests to the data source object, such as the default user and the default password associated with the data source object. Alternatively, in one embodiment, the connection pool factory object is used as a connection factory for the associated connection pool 116a-116n and connection pool factory object properties are used for the data source object properties.

A particular service, such as any of services 106a-106n, may be provided by one or more instances 108a-108n. A particular service is associated with a particular connection pool 116a-116n that consists of multiple connections to the one or more instances. For example, service 106a may be provided through connections from connection pool 106a; service 106b may be provided by connections from connection pool 106b; and service 106n may be provided by connections from connection pool 106n. Such an association, or mapping, can be implemented by setting and maintaining URLs that identify the instances 108a-108n that can provide a given service 106a-106n, where such an association is maintained by the connection pool manager 114. The database publishes many services. The connection pools 116a-116n can use any service that is identified, such as by the URL or a connect string.

In general, a daemon is a process that runs in the background and that performs a specified operation at predefined times or in response to certain events. In general, an event is an action or occurrence whose posting is detected by a process. Notification service daemon 118 is a process that receives event information from server 104, such as from clusterware that is configured to manage the cluster of instances 106a-106n. Such event information may include, for example, service, instance and node up or down event information. The database server 104 posts events when conditions change (i.e., UP, DOWN, NOT RESTARTING), as described in more detail herein.

Notification service daemon 118 has a publisher/subscriber relationship with event handler 120, through which certain event information that is received by daemon 118 from server 104 is transmitted to event handler 120. In general, an event handler is a function or method containing program statements that are executed in response to an event. In response to receiving event information from daemon 118, event handler 120 invokes a method of connection pool manager 114, passing along the event type and property, which are described hereafter. In turn, a worker thread is created, per event, to process information between connection pool manager 114 and one or more relevant connection pools 116a-116n, for managing connections to sessions with server 104.

Transmission of event information from server 104 to notification service daemon 118, and from notification service daemon 118 to event handler 120, is "out-of-band". In this context, out-of-band means that such transmission is not through the session communication path because that path may be blocked due to the event, i.e., the session is blocked, waiting for the dead node to respond. For example, the out-of-band notifications may be issued asynchronously through gateway processes that are not part of the clusterware that manages the cluster. For a non-limiting example, notification service daemon 118 may use the Oracle Notification Service (ONS) API, which is a messaging mechanism that allows application components based on the Java 2 Platform, Enterprise Edition (J2EE) to create, send, receive, and read messages.

Notification Event Payload

When the state of a given service changes, i.e., when the state of a cluster resource that participates in performing the work of the given service changes, the new state is notified to interested subscribers through notification events. Applications can use this notification, for example, to achieve very fast detection of failures and for balancing of connection pools following failures and when the failed components are repaired and restarted. Each notification event that event handler 120 subscribes to and receives from notification service daemon 118, is received in the form of an event type and event property. The event type specifies whether the event is related to a service, to a cluster node, to a database, or to an instance. The event property contains details for an event.

"Fast application notification" events are one example of an implementation of a high availability event structure and associated notification procedure to which a connection pool manager 114 responds when redistributing sessions on a cluster. Techniques for fast application notification are described in detail in U.S. patent application Ser. No. 10/917,660 filed on Aug. 12, 2004, entitled "Fast Application Notification In a Clustered System", the disclosure of which is incorporated by reference in its entirety for all purposes as if fully set forth herein. In one embodiment, the events of interest to the connection pool manager include event property information as detailed in the foregoing referenced application.

The key property that is included in a notification event is the service name, which identifies the service to which the event corresponds. The connection pool manager 114 uses the service name to lookup, or match, the correct connection pool 116a-116n that belongs to this service. The service name includes the domain name for the associated service. When a service name match is found, further failover processing occurs. When a service name match fails, in one embodiment, the event is simply ignored by the subscriber.

The database unique name identifies the database that is offering the service associated with the event, because the same service may be offered by multiple databases. The database "unique" name is a unique name separate from the database name because databases may be cloned. The instance name indicates whether a specific instance is up or down, or if the entire service is up or down. If the instance value is null, then all instances are down, that is, the entire service is down. Otherwise, the specific instance identified by the instance name is down. For an UP event, if the instance name is null, then if the event type is "node", then recovery processing is done on all connections that are on this node, which entails matching of the node name from the event property to the node name on every connection.

The cardinality identifies the number of instances of the service, which can be used for redistribution of connections across the cluster in response to UP and DOWN events. The status field value indicates whether this is an UP event, a DOWN event, or a NOT RESTARTING event. The reason field indicates whether the service event is planned or unplanned, i.e., whether the change was user-initiated or due to a failure.

Event Processing

The connection pool manager 114 maintains, for each service, a mapping of session connections to cluster location, i.e., nodes, databases and instances. Whenever a connection is established, the connection pool manager 114 records the location of the session connection. The manner in which session location information is recorded may vary from implementation to implementation. For non-limiting examples, session location information may be posted on a "bulletin board" mechanism that is accessible to various subscribers, or the session location information may be stored in an indexed table or a hash table, or the session location information may be obtained in linked lists. The session location information is used for fast redistribution of the connection pool whenever a notification event is received for a service, instance or node. A fast redistribution of the connections benefits the runtime distribution of work in the cluster by moving connections to functioning cluster components and, therefore, ensuring that the connection pool has connections that are ready to use when session requests are received.

In one embodiment, a dual index structure is used to implement the mappings, from service to database and instance, and from service to node, as follows:

Service⇒Database name⇒Instance name⇒Connections;
Service⇒Node name⇒Connections.

Down Event Processing

If a specific service is down at a specific instance, then the specific connections connected to this instance for this service are removed from the pool. If a node is down, then all connections associated with that node are removed from the pool.

The number of connections that are authenticated as the default user of a data source object and those connections that are stateless (described hereafter), which are removed from the connection pool, is tracked. This number can be used during up event processing by the connection pool manager 114, as described hereafter. If the number of connections falls below a specified minimum connection pool limit for a given connection pool 116a-116n, then upon the first successful connection to the server 104, the connections are populated back to the minimum limit.

Stateless connections are associated with connection objects that have no connection attributes or tagging specified by a client. For example, a client may tag a connection object with session state information (e.g., a transaction isolation level), and identify the tagged connection, so that the client does not have to reinitialize the session each time it uses the connection. Hence, the client can borrow the tagged connection from the connection pool, use it to perform some work, place it back in the connection pool and borrow it again for further work, without having to waste resources on round trips to the database to reinitialize the session state.

The connection pools 116a-116n can include both stateless connections and connections with state information. However, in an embodiment, only the number of stateless connections is tracked by the connection pool manager 114, rather than also connections with state.

According to one embodiment, when processing for connection recovery, the connections in the connection pool's "checked out" list are processed after claiming the connections from the application that is using such connections, and then the connections that are available for use from a given connection pool are processed. Applications, such as clients 102a-102n, that have connections to the down instance checked out (or borrowed) from the relevant connection pool 116a-116n, receive an error (i.e., node with service down or instance down) and immediately the checked out connection are identified (e.g., via the hash table) and cleaned up. In one embodiment, the application is expected to borrow another connection from the connection pool, determine the last result and resubmit the request.

The connections that are affected by such an event can be identified by a state having only a socket connection value, without a corresponding session value. Generally, upon a service down event, connections in a relevant connection pool are aborted as quickly as possible. In addition, applications that request connections from the pool are prevented from receiving invalid or bad connections.

Service Down at an Instance Event

FIG. 2 is a flow diagram that illustrates a method for managing connections in response to a "service down at an instance" event, according to an embodiment. At block 202, a notification of an event, which identifies a termination of a service on a particular instance, is received. For example, connection pool manager 114 receives event information from event handler 120, wherein the relevant instance and service are identified.

Once connection pool manager 114 receives event information that is associated with a service down at an instance event from event handler 120, connection pool manager 114 handles the event by matching the service and instance names that are identified in the event information with the session location information that was provided when the session connected. Hence, at block 204, based on the notification, a connection pool that is associated with the particular service is identified.

One or more connections from the identified connection pool are processed as follows. In one embodiment, at block 206, one or more connections are identified which are associated with the instance and the connection pool identified in the event information. For example, connection pool manager 114 handles the event by matching the instance name that is identified in the event information with the instance name that is set in each session location information that is associated with a respective connection, e.g., via a hash table.

At block 208, each connection that is identified at block 206 is marked as invalid. While invalid, the particular connection cannot be assigned to a requesting process. In one embodiment, a variable is maintained for the relevant connection pool, which indicates whether the connection pool has been processed for a down event. Hence, if a subsequent down event is received which identifies the down service that is associated with the previously processed connection pool, and which identifies a particular down instance, then no processing is performed and computational resources are not wasted.

At block 210, each connection that is marked down is aborted. A specific method on the connection pool may be invoked for removal of the connections, where the method actually performs the removal processing, for example, by calling each connection's abort( ) method. Aborting the connection interrupts the blocked application thread, which is typically blocked (i.e., waiting for read/write on a socket) when the service or node goes down, and enables release of client side resources. Upon successful completion of the abort, the connection is effectively eliminated from the pool, thereby ensuring removal of the stale connection. In general, affected sessions blocked in I/O are aborted and affected sessions that are idle or checked out and between calls are redistributed across the cluster. In one embodiment, the abort process is a low level TCP implementation to interrupt the session.

One example of how the one or more connections from the identified connection pool are processed, according to embodiments, is as follows. If a service-connection pool match is made at block 204, then relevant event information is posted on a FIFO queue that the matching connection pool manages. Connection pool manager 114 determines whether a worker thread already exists for processing connections from the identified connection pool. If such a worker thread does not already exist, then connection pool manager 114 spawns a worker thread to work on the failover processing of connections that are associated with the connection pool. For high availability purposes, threads should be cached and kept open.

The database instance name is hashed or used as the index to locate the relevant connections quickly. For each connection for which a match is found, the connection is marked down, e.g., marked as invalid, thereby allowing for fast processing and preventing bad or invalid connections from being handed out of the connection pool. The number of connections that are authenticated as the default user of a data source object, and those connections that are stateless and that are removed from the connection pool, is tracked. This number can be used during up event connection processing, as described hereafter. The worker thread can continue to process events as long as there are events in the queue.

Node Down Event

As discussed, when physical connections to the server 104 are created, the associated instance(s) 108a-108n and cluster node(s) 110a-110n are specified in the respective connection session location information. When connection pool manager 114 receives event information that indicates that a host node 110a-110n is down, a worker thread scans the relevant connection pool that is associated with the service (a) that is identified in the event notification and (b) that is hosted by one or more instances that are hosted on the node that is identified in the notification, to match the host name that is identified in the event information with associated connections from the connection pool. Again, the node is used as the hash or index value to locate the session's connection. If a match is found, processing is similar to an instance down event, for which the matched connections are marked as invalid and then aborted, sockets are reset, and the application can resume on a different, good connection. In an embodiment, the matched connections that are checked out and held by applications are processed first and the inactive matched connections are processed next.

Service Up Event

Figure 3:
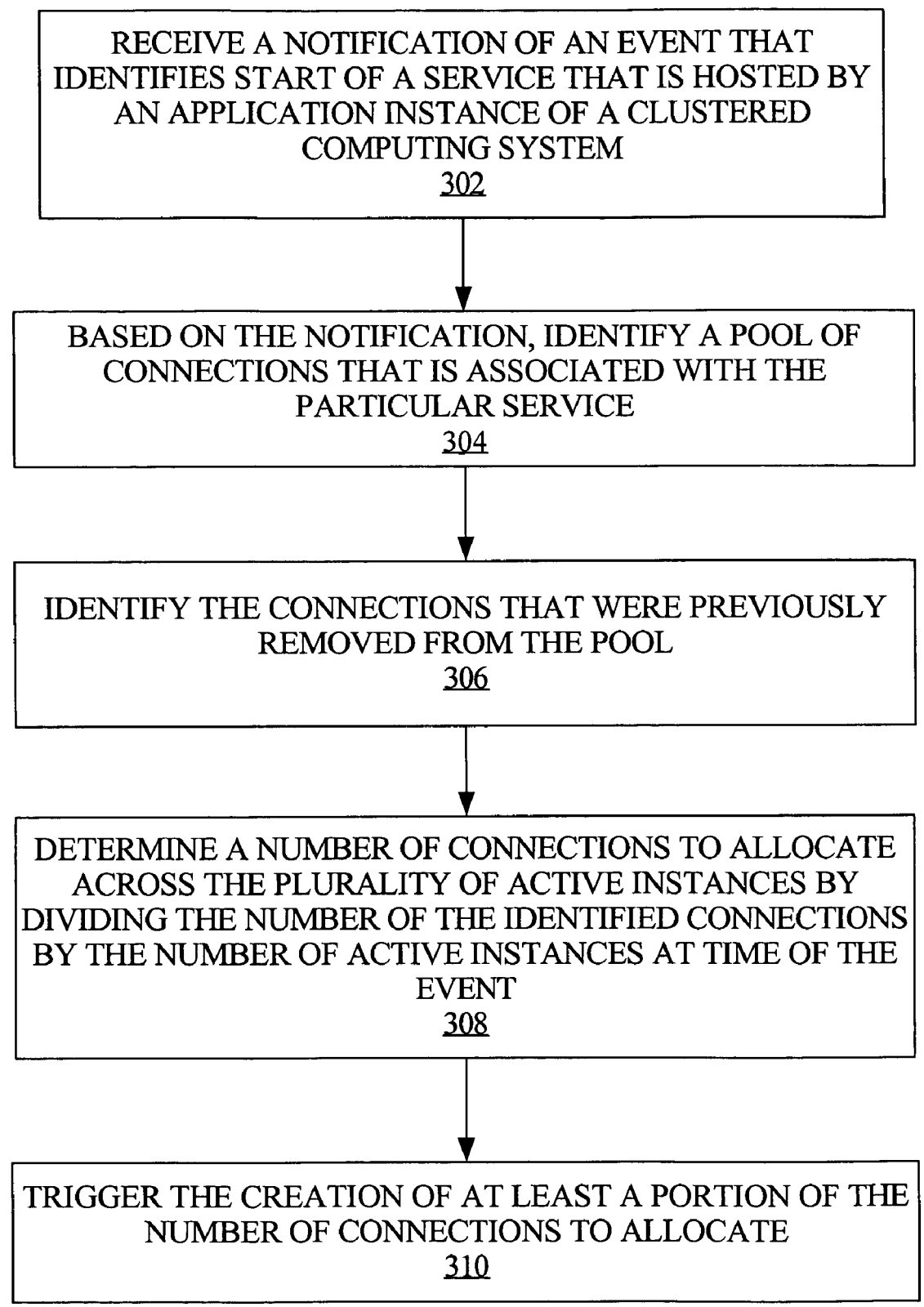
FIG. 3 is a flow diagram that illustrates a method for managing connections in response to an up event, according to an embodiment.

FIG. 3 is a flow diagram that illustrates a method for managing connections in response to an up event, according to an embodiment. At block 302, a notification of an event which publishes the availability of a service at an instance, such as an instance 108a-108n, is received. For example, connection pool manager 114 receives event information that is associated with a particular service up event from event handler 120, wherein the instance name field contains the name of the instance that initialized (or some other instance identifier) and the number of instances in the cluster, i.e., the cardinality. At block 304, based on the notification, a connection pool that is associated with the particular service is identified.

One or more connections from the identified connection pool are processed as follows. In one embodiment, at block 306, one or more of a certain type of connections that were previously removed from the pool (i.e., default user authenticated/stateless) is identified, for determining a number of connections to distribute across a plurality the new resources that are providing the particular service. The plurality of active instances includes the instance that was identified as initialized in the event information. As discussed in reference to an embodiment, part of service down processing includes tracking the number of connections that are authenticated as the default user of a data source object and those connections that are stateless, which are removed from the connection pool. Hence, at block 306, connection pool manager 114 handles the event by accessing this number of connections that was tracked during previous down processing.

At block 308, the number of connections to allocate, or distribute, across a number of active instances is determined. In an embodiment, upon receiving a service up event, the number of connections to be balanced across existing active instances supporting the service is determined using the following procedure. The number of connections to distribute is determined from the number of those previously-removed connections that are stateless and that have the default user/password information set on the data source, referred to hereafter as the "selected connections". The connection creation logic may use a cardinality value (received in the event payload), which represents the number of active instances in a cluster at the time the up event was generated, to determine how many connections to release and recreate.

In an embodiment, if the number of selected connections is zero, such as when an up event is received when there was not a previous down event, then a portion of the total number of existing connections associated with the relevant connection pool are created by instantiating respective connection objects, and load balanced by the listener process across the active instances. For example, only 25% of the number of such existing connections are recreated and balanced. Hence, there is still connection capacity within the limits of the relevant connection pool for allocation to subsequent instances that initialize. In order to load balance, some idle connections associated with the relevant connection pool may need to be closed and recreated.

When the number of selected connections is greater than zero (based on the number of previously-removed connections that is tracked during down event processing), the number of connections to load balance is set equal to the number of selected connections divided by the cardinality value. In an embodiment, the process of recreating and rebalancing some connections is performed iteratively, such as in 25% increments or until the specified maximum number of connections is reached.

At block 310, the creation of at least a portion of the number of connections to allocate (determined at block 308)

is triggered. For example, connection pool manager 114 invokes a "create connection" method on a listener process or thread that is associated with server 104 for each of the connections to be created for the particular service. In turn, the listener process determines where to create the new connections, i.e., to what instances the server should allocate the created connections. Alternatively, the connection pool can request the listener to create connections as the named instance.

In an embodiment, if the number of connections to allocate plus the total number of existing connections associated with the relevant connection pool is greater than a specified maximum number of connections for that connection pool, then some connections are closed and recreated. Since the load balancing process performed by the database listener is performed during "connect-time" (i.e., when the connections are created), closing and recreating some of the connections will automatically rebalance the connections based on session metrics and/or runtime load balancing metrics.

Generally, with the described techniques, when an up event is generated, connections are established and automatically and instantaneously load balanced to the active instances, including the newly active instance, without waiting for client connection retries or requests.

Implementation Mechanisms

The approach for fast processing of connections to a clustered computing system, as described herein, may be implemented in a variety of ways and the invention is not limited to any particular implementation. The approach may be integrated into a system or a device, or may be implemented as a stand-alone mechanism. Furthermore, the approach may be implemented in computer software, hardware, or a combination thereof.

Hardware Overview

Figure 4:
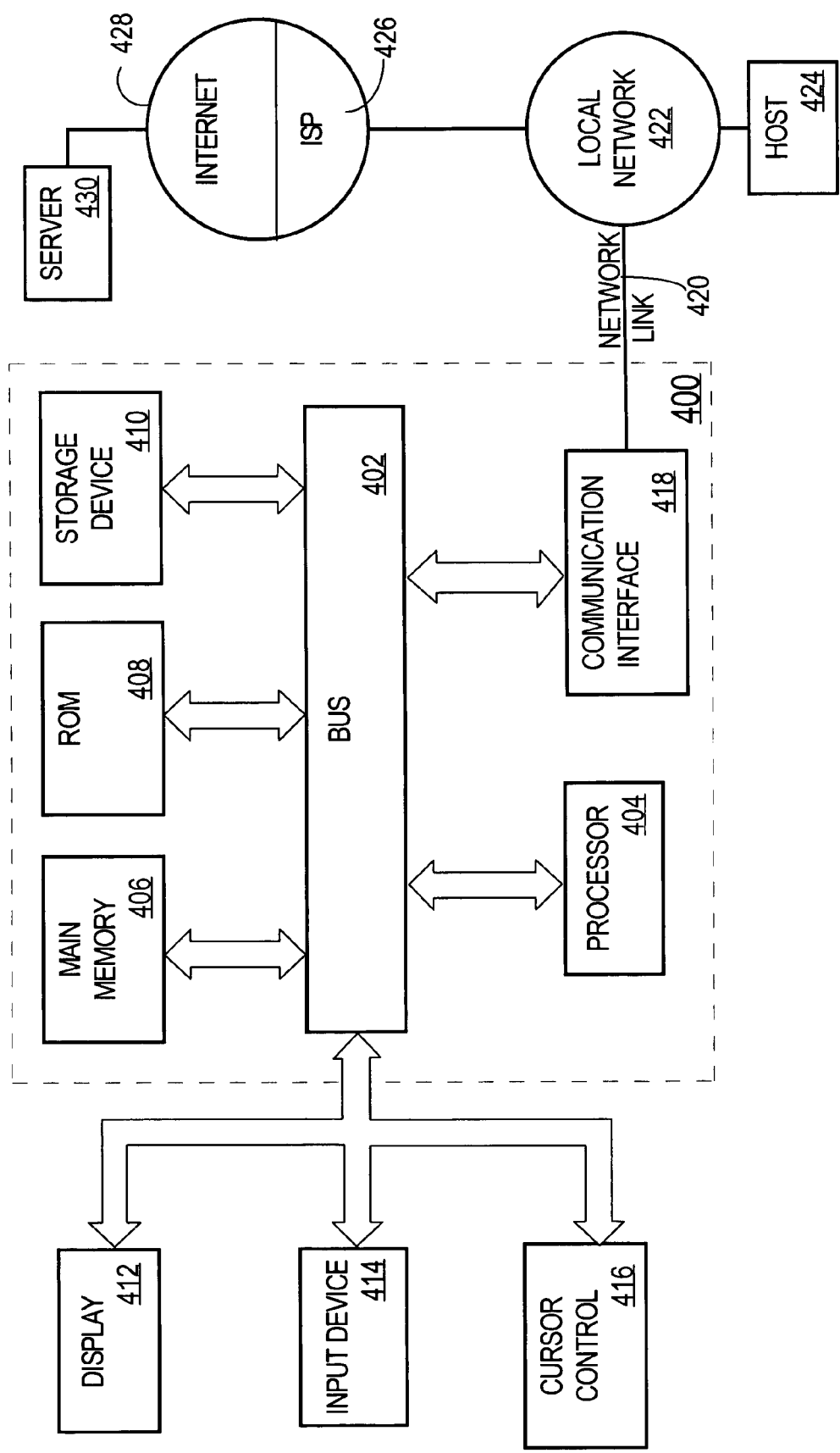
FIG. 4 is a block diagram that depicts a computer system upon which an embodiment of the invention may be implemented.

FIG. 4 is a block diagram that depicts a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, embodiments of the invention are described herein in the context of a server; however, the described techniques are applicable to any clustered computing system over which system connections are allocated or assigned, such as with a system configured as a computing cluster or a computing grid. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-implemented method comprising: receiving a notification of an event regarding a clustered computing system;
   based on said notification, identifying a pool of connections to said clustered computing system;
   wherein said notification is received out-of-band of any connection in said pool of connections;
   wherein each connection in said pool of connections is a connection to a database session of one or more database sessions; and
   in response to said event, processing one or more connections from said pool, wherein said processing includes:
   marking said one or more connections as invalid; and
   aborting said one or more connections;
   after receiving said notification of said event, receiving a second notification that identifies a start of a particular service that is hosted on a particular server instance of said clustered computing system; and
   determining a second number of said one or more connections for allocating across a plurality of active server instances that host said particular service;
   wherein the method is performed by one or more computers.

2. The method of claim 1, further comprising:
   recording the location of sessions associated with connections from said pool of connections; and
   identifying said one or more connections for said processing based on said location of sessions matching information in said notification.

3. The method of claim 1, wherein identifying includes identifying a pool that is associated with one or more services that are identified in said notification; and
   wherein said processing includes invoking a process to create one or more connections in association with said pool of connections.

4. The method of claim 3, wherein invoking a process to create one or more connections includes invoking a process on a clustered database server, and wherein said process allocates said one or more connections across said clustered database server based on state changes that are associated with said particular service that is hosted by one or more instances associated with said clustered database server.

5. The method of claim 3, wherein said particular service is hosted by one or more instances associated with a clustered database server.

6. The method of claim 3, wherein said particular service is hosted by one or more instances associated with a clustered database server configured in a plurality of clusters that are processing instructions as a computing grid.

7. The method of claim 1,
   wherein said notification identifies termination of a particular service that was hosted on a particular server instance of said clustered computing system;
   wherein said identifying further includes identifying said pool that is associated with (a) said particular service, (b) a database being used in said clustered computing system, (c) said particular server instance, and (d) a node of said clustered computing system, that are identified in said notification;
   wherein said processing of connections further includes identifying one or more connections, from said pool, that is associated with said database and said particular server instance.

8. The method of claim 1, wherein determining said second number further comprises:
   identifying a first number of said one or more connections that are removed from said pool; and
   determining said second number based on said first number.

9. The method of claim 8, further comprising:
   requesting creation of at least a portion of said second number of said one or more connections, for immediate allocation across said plurality of active server instances that host said particular service.

10. The method of claim 9, wherein determining said second number includes determining said second number by dividing said first number by a number of said plurality of active server instances that host said particular service.

11. The method of claim 10, wherein
   if said second number is not greater than zero, then
   closing a subset of connections from said pool,
   recreating said subset of connections in association with said pool for allocating said subset of connections to said plurality of active server instances that host said particular service.

12. The method of claim 11, wherein allocating said subset of connections is based on server performance metrics that are associated with said plurality of active server instances that host said particular service.

13. The method of claim 1,
wherein said notification identifies termination of a node that is hosting one or more server instance that is hosting at least a portion of a particular service that is provided by said clustered computing system;
wherein said identifying includes identifying a pool that is associated with said particular service that is identified in said notification; and
wherein said processing of connections includes
identifying one or more connections from said pool that are associated with said node;
marking said one or more connections as invalid, and
aborting said one or more connections so that one or more clients are interrupted.

14. The method of claim 13, wherein said aborting includes interrupting TCP/IP-based communications associated with said one or more connections.

15. The method of claim 13, wherein said aborting allows said one or more clients to quickly recover from said event.

16. A non-transitory computer-readable storage medium storing one or more sequences of instructions which, when executed by one or more processors, causes the one or more processors to perform:
receiving a notification of an event regarding a clustered computing system;
based on said notification, identifying a pool of connections to said clustered computing system;
wherein said notification is received out-of-band of any connection in said pool of connections;
wherein each connection in the pool of connections is a connection to a database session of one or more database sessions; and
in response to said event, processing one or more connections from said pool, wherein said processing includes:
marking said one or more connections as invalid; and
aborting said one or more connections;
after receiving said notification of said event, receiving a second notification that identifies a start of a particular service that is hosted on a particular server instance of said clustered computing system; and
determining a second number of said one or more connections for allocating across a plurality of active server instances that host said particular service.

17. The non-transitory computer-readable storage medium of claim 16, further comprising instructions which, when executed by the one or more processors, causes the one or more processors to perform: recording the location of sessions associated with connections from said pool of connections; and
identifying said one or more connections for said processing based on said location of sessions matching information in said notification.

18. The non-transitory computer-readable storage medium of claim 16, wherein identifying includes identifying a pool that is associated with one or more services that are identified in said notification; and
wherein said processing includes invoking a process to create one or more connections in association with said pool of connections.

19. The non-transitory computer-readable storage medium of claim 18, wherein invoking a process to create one or more connections includes invoking a process on a clustered database server, and wherein said process allocates said one or more connections across said clustered database server based on state changes that are associated with said particular service that is hosted by one or more instances associated with said clustered database server.

20. The non-transitory computer-readable storage medium of claim 18, wherein said particular service is hosted by one or more instances associated with a clustered database server.

21. The non-transitory computer-readable storage medium of claim 18, wherein said particular service is hosted by one or more instances associated with a clustered database server configured in a plurality of clusters that are processing instructions as a computing grid.

22. The non-transitory computer-readable storage medium of claim 16, wherein said notification identifies termination of a particular service that was hosted on a particular server instance of said clustered computing system;
wherein said identifying further includes identifying said pool that is associated with (a) said particular service, (b) a database being used in said clustered computing system, (c) said particular server instance, and (d) a node of said clustered computing system, that are identified in said notification;
wherein said processing of connections further includes identifying one or more connections, from said pool, that is associated with said database and said particular server instance.

23. The non-transitory computer-readable storage medium of claim 16, wherein instructions to perform determining said second number further comprises instructions that cause the one or more processors to perform:
identifying a first number of said one or more connections that are removed from said pool; and
determining said second number based on said first number.

24. The non-transitory computer-readable storage medium of claim 23, further comprising one or more sequences of instructions which, when executed by one or more processors, causes the one or more processors to perform:
requesting creation of at least a portion of said second number of said one or more connections, for immediate allocation across said plurality of active server instances that host said particular service.

25. The non-transitory computer-readable storage medium of claim 24, wherein determining said second number includes determining said second number by dividing said first number by a number of said plurality of active server instances that host said particular service.

26. The non-transitory computer-readable storage medium of claim 25, wherein if said second number is not greater than zero, then closing a subset of connections from said pool,
recreating said subset of connections in association with said pool for allocating said subset of connections to said plurality of active server instances that host said particular service.

27. The non-transitory computer-readable storage medium of claim 26, wherein allocating said subset of connections is based on server performance metrics that are associated with said plurality of active server instances that host said particular service.

28. The non-transitory computer-readable storage medium of claim 16, wherein said notification identifies termination of a node that is hosting one or more server instance that is hosting at least a portion of a particular service that is provided by said clustered computing system;
wherein said identifying includes identifying a pool that is associated with said particular service that is identified in said notification; and wherein said processing of connections includes identifying one or more connections from said pool that are associated with said node;
marking said one or more connections as invalid, and
aborting said one or more connections so that one or more clients are interrupted.

29. The non-transitory computer-readable storage medium of claim 28, wherein said aborting includes interrupting TCP/IP-based communications associated with said one or more connections.

* * * * *